US008793755B2

(12) United States Patent
Montena et al.

(10) Patent No.: US 8,793,755 B2
(45) Date of Patent: Jul. 29, 2014

(54) BROADBAND REFLECTIVE PHASE CANCELLING NETWORK INTERFACE DEVICE

(71) Applicant: PPC Broadband, Inc., East Syracuse, NY (US)

(72) Inventors: Noah P. Montena, Syracuse, NY (US); Steven K. Shafer, Chittenango, NY (US); Erdogan Alkan, Fayetteville, NY (US); Paul F. Bailey, Camillus, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 0 days.

(21) Appl. No.: 13/669,805

(22) Filed: Nov. 6, 2012

(65) Prior Publication Data

US 2013/0133019 A1 May 23, 2013

Related U.S. Application Data

(60) Provisional application No. 61/559,508, filed on Nov. 14, 2011.

(51) Int. Cl.
*H04N 7/173* (2011.01)
*H04N 7/10* (2006.01)

(52) U.S. Cl.
CPC ........... *H04N 7/104* (2013.01); *H04N 7/17309* (2013.01)
USPC .......................................... 725/127; 725/149

(58) Field of Classification Search
CPC .... H04N 7/102; H04N 7/104; H04N 7/17309
USPC ........................................................ 725/127
See application file for complete search history.

(56) References Cited

U.S. PATENT DOCUMENTS

| 4,430,731 | A | | 2/1984 | Gimple et al. | |
|---|---|---|---|---|---|
| 4,920,233 | A | | 4/1990 | Kincaid | |
| 5,125,100 | A | * | 6/1992 | Katznelson | 725/143 |
| 5,481,389 | A | * | 1/1996 | Pidgeon et al. | 398/208 |
| 5,604,528 | A | * | 2/1997 | Edwards et al. | 725/25 |
| 5,834,697 | A | | 11/1998 | Baker et al. | |
| 5,930,678 | A | * | 7/1999 | Alley et al. | 725/146 |
| 6,091,932 | A | | 7/2000 | Langlais | |
| 6,466,913 | B1 | * | 10/2002 | Yasuda et al. | 704/500 |
| 6,542,540 | B1 | | 4/2003 | Leung et al. | |

(Continued)

FOREIGN PATENT DOCUMENTS

WO 0111767 A1 2/2001

*Primary Examiner* — Nasser Goodarzi
*Assistant Examiner* — Michael B Pierorazio
(74) *Attorney, Agent, or Firm* — Hiscock & Barclay, LLP

(57) ABSTRACT

A network interface device including a signal splitter which conducts CATV signals through an active branch circuit, the active branch circuit including an active signal conditioner which modifies characteristics of active branch signals conducted through the active branch circuit, a sensor connected to sense normal, inoperative and abnormally operative conditions, the sensor removing a control signal indicative of inoperative and abnormal operating conditions, a selectable switch connected to the active branch circuit, the selectable switch communicating the CATV signals between the CATV network and the subscriber devices when in an activated position, and the selectable switch passing the signals to a signal reduction path when in a deactivated position, the selectable switch assuming the deactivated position in response to the de-assertion of the control signal, and a phase cancellation circuit connected to the signal reduction path.

20 Claims, 13 Drawing Sheets

(56) References Cited

U.S. PATENT DOCUMENTS

| | | | |
|---|---|---|---|
| 6,721,371 B1* | 4/2004 | Barham et al. | 375/316 |
| 7,133,652 B2 | 11/2006 | Nast et al. | |
| 7,530,091 B2* | 5/2009 | Vaughan | 725/106 |
| 7,580,693 B2 | 8/2009 | Rohde et al. | |
| 7,679,471 B2 | 3/2010 | Rijssemus et al. | |
| 7,883,363 B2 | 2/2011 | Montena | |
| 8,045,066 B2* | 10/2011 | Vorenkamp et al. | 348/726 |
| 2001/0046268 A1* | 11/2001 | Sharma | 375/324 |
| 2002/0056135 A1* | 5/2002 | Sharma | 725/126 |
| 2005/0056454 A1 | 3/2005 | Clark | |
| 2006/0124342 A1 | 6/2006 | Clark | |
| 2006/0141976 A1* | 6/2006 | Rohde et al. | 455/326 |
| 2010/0017842 A1* | 1/2010 | Wells | 725/149 |
| 2010/0100918 A1* | 4/2010 | Egan et al. | 725/111 |
| 2010/0125877 A1* | 5/2010 | Wells et al. | 725/78 |
| 2010/0146564 A1* | 6/2010 | Halik et al. | 725/78 |
| 2010/0266000 A1 | 10/2010 | Froimovich et al. | |
| 2010/0311277 A1 | 12/2010 | Montena | |
| 2011/0140761 A1 | 6/2011 | Nagayama et al. | |
| 2011/0154429 A1* | 6/2011 | Stantchev | 725/149 |
| 2012/0151548 A1* | 6/2012 | Rakib | 725/126 |

* cited by examiner

BROADBAND REFLECTIVE PHASE CANCELLING NETWORK INTERFACE DEVICE

CROSS-REFERENCE TO RELATED APPLICATIONS

This application claims priority to U.S. Provisional Application Ser. No. 61/559,508, filed on Nov. 14, 2011.

FIELD OF THE ART

This disclosure relates generally to the transmission and reception of radio- or high-frequency signals over cable networks, such as cable television (CATV) networks. More particularly, the present invention relates to a new and improved network interface device which delivers high-frequency signals to subscriber devices in a way that automatically maintains high signal integrity by improving return losses in the event of an inoperative or abnormally operative condition of the terminal adapter.

BACKGROUND

Cable television (CATV) service providers offer television, data, telephone and other entertainment and useful services to subscribers at the subscriber's premises.

The typical medium for delivering these services is a cable network which is formed by a relatively large number of high-frequency, electrical signal-conducting coaxial conductors or cables, all of which are linked together to distribute the high-frequency signals over a wide geographic area to substantial numbers of geographically-separated subscribers. The high-frequency signals are delivered to television sets, computers, telephones and other subscriber devices, and those subscriber devices convert the information carried by the high-frequency signals into the services that the subscriber desires.

Because of the extensive nature of the cable network, the signals received at the subscriber premises are reduced in strength compared to the strength of the transmitted signals. The amount of signal strength reduction depends on the length of the pathway through the cable network which the signals pass before arriving at the subscriber premises. For this reason, it is typical to provide an amplifier at the subscriber premises to increase or amplify the strength of the signals received from the cable network before delivering the signals to the subscriber devices.

Some types of subscriber devices, such as television sets, deliver better performance in response to receiving amplified signals. Other types of subscriber devices may require non-amplified or passive signals for proper functionality. For example, lifeline telephone service operates on the basis of passive signals received at the subscriber premises, because the functionality of such telephone service cannot depend on the proper functionality of an amplifier or other active signal conditioner in the signal path. A failed or inoperative amplifier or other active device in the signal path could completely terminate telephone communications, which could be dangerous in emergency situations.

Passive-active network interface devices have been developed to provide both passive and active, i.e. amplified, signals at the subscriber premises for the two different types of subscriber devices which operate from passive and active signals. Such passive-active network interface devices include a signal splitter which essentially divides or branches the incoming, or "downstream," signals from the cable network into passive and active branches. The passive branch downstream signals are conducted through a passive branch of the network interface device without amplification or modification and applied to those subscriber devices which require passive signals for operation, such as, for example, a voice modem for a telephone set. The active branch downstream signals are conducted to an active signal conditioner, such as an amplifier, of an active branch of the network interface device. The active signal conditioner amplifies the strength of the signals or modifies some characteristic of the signals before the amplified, or conditioned, signals are delivered to one or more subscriber devices. The amplified signals are applied to those subscriber devices that benefit from the amplified signals, such as a television sets and computers.

The high-frequency signals conducted through the cable network are susceptible to distortion from a number of sources. It is for this reason that coaxial cables are widely used to shield the high-frequency signals from degrading influences of the ambient environment. One requirement for maintaining high-quality signal conduction in a coaxial cable is properly terminating the coaxial cable. An improper termination causes reflections of the incident signals back into the transmission path. The reflections cause degradation of the desired incident signals received by the subscriber. The degradations are exemplified by amplitude ripple, group delay ripple, latency, and other similar effects which distort or reduce the incident signals. The signal reflections cause the subscriber to experience a degraded quality of service, or in some cases the level of degradation may be so severe as to prevent the subscriber from receiving meaningful service.

SUMMARY

A network interface device connecting subscriber devices to a cable television (CATV) network over which downstream signals are transmitted to the subscriber devices and upstream signals are transmitted from the subscriber devices to a headend, the subscriber devices including a passive subscriber device and an active subscriber device, the network interface device including a first signal splitter which conducts CATV signals through a passive branch circuit and an active branch circuit, the active branch circuit including an active signal conditioner which modifies characteristics of active branch signals conducted through the active branch circuit, a sensor connected to the active branch circuit, the sensor sensing power consumption of the active branch circuit indicative of normal, inoperative and abnormally operative conditions of the network interface device, the sensor supplying a first control signal indicative of normal operating conditions and removing a second control signal indicative of inoperative and abnormal operating conditions, a selectable switch connected to the active branch circuit, the selectable switch having an activated position and a deactivated position, the selectable switch communicating the CATV signals between the CATV network and the subscriber devices when in the activated position, and the selectable switch communicating the CATV signals to a signal reduction path when in the deactivated position, the selectable switch assuming the activated position in response to the assertion of the first control signal and assuming the deactivated position in response to the de-assertion of the second control signal, and a phase cancellation circuit connected to the signal reduction path, the phase cancellation circuit adapted to convert the CATV signals into a reference signal and a phase-delayed signal, the phase-delayed signal being out of phase with respect to the reference signal, the phase cancellation circuit further adapted to recombine the reference signal and the phase-delayed signal to a single, reduced CATV signal.

A network interface device connecting subscriber devices to a cable television (CATV) network over which downstream signals are transmitted to the subscriber devices and upstream signals are transmitted from the subscriber devices to a headend, the subscriber devices including a passive subscriber device and an active subscriber device, the network interface device including a first signal splitter which conducts CATV signals through a passive branch circuit and an active branch circuit, the active branch circuit including an active signal conditioner which modifies characteristics of active branch signals conducted through the active branch circuit, a sensor connected to the active branch circuit, the sensor sensing power consumption of the active branch circuit indicative of normal, inoperative and abnormally operative conditions of the network interface device, the sensor supplying a first control signal indicative of normal operating conditions and removing the second control signal indicative of inoperative and abnormal operating conditions, a selectable switch connected to the active branch circuit, the selectable switch having an activated position and a deactivated position, the selectable switch communicating the CATV signals between the CATV network and the subscriber devices when in the activated position, and the selectable switch communicating the CATV signals to a signal reduction path when in the deactivated position, the selectable switch assuming the activated position in response to the assertion of the first control signal and assuming the deactivated position in response to the de-assertion of the second control signal, and a phase cancellation circuit connected to the signal reduction path, the phase cancellation circuit adapted to convert the CATV signals into a plurality of signal components and communicate the plurality of signal components to a corresponding plurality of electrical paths, each of the corresponding plurality of electrical paths having different electrical lengths.

A network interface device connecting subscriber devices to a cable television (CATV) network over which downstream signals are transmitted to the subscriber devices and valid upstream signals are transmitted from the subscriber devices to a headend, the subscriber devices including a passive subscriber device and an active subscriber device, the network interface device including a first signal splitter which conducts upstream and downstream signals through a passive branch circuit and an active branch circuit, the active branch circuit including an active signal conditioner which modifies characteristics of active branch upstream and downstream signals conducted through the active branch circuit, a sensor connected to sense power consumption of the active branch circuit indicative of normal, inoperative and abnormally operative conditions of the network interface device, the sensor supplying a first control signal indicative of normal operating conditions and supplying a second control signal indicative of inoperative and abnormal operating conditions, a first switch connected to the active branch circuit of the first signal splitter, the selectable switch having an activated position and a deactivated position, the selectable switch communicating the upstream and downstream CATV signals between the CATV network and the subscriber devices when in the activated position, and the selectable switch passing the upstream and downstream signals to a signal reduction path when in the deactivated position, the selectable switch assuming the activated position in response to the assertion of the first control signal and assuming the deactivated position in response to the de-assertion of the second control signal, a phase cancellation circuit connected to the signal reduction path, and a second switch connected to the active branch circuit and the control circuit, the second switch having an activated position and a deactivated position, the second switch communicating the upstream and downstream CATV signals between the CATV network and the active subscriber device when in the activated position, and the second switch receiving the reduced CATV upstream and downstream signal from the phase cancellation circuit when in the deactivated position, the second switch assuming the activated position in response to the assertion of the control signal and assuming the deactivated position in response to the de-assertion of the control signal.

BRIEF DESCRIPTION OF THE DRAWINGS

The features described herein can be better understood with reference to the drawings described below. The drawings are not necessarily to scale. Emphasis, instead, is generally being placed upon illustrating the principles of the invention. In the drawings, like numerals are used to indicate like parts throughout the various views.

DETAILED DESCRIPTION

Figure 1:
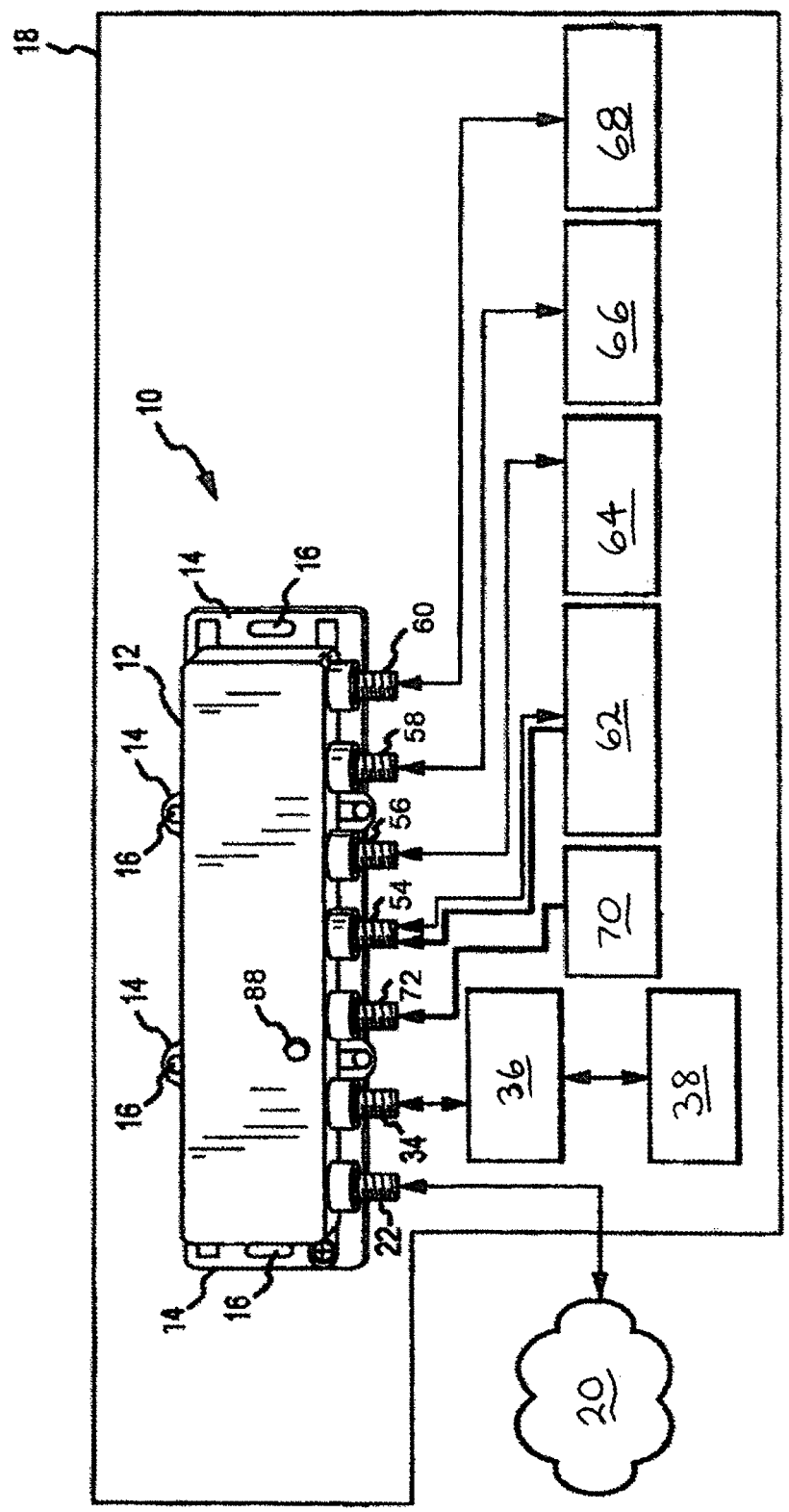
FIG. 1 depicts a perspective view of a network interface device according to one embodiment of the present invention, shown connected to a cable network and subscriber devices, which are illustrated in block diagram form.

A network interface device 10 such as a passive-active network interface device which incorporates embodiments of the present invention is shown in FIG. 1. The network interface device 10 includes a housing 12 which encloses active and passive internal electronic circuit components (shown in FIGS. 2 and 3). A mounting flange 14 surrounds the housing 12, and holes 16 in the flange allow attachment of the network interface device 10 to a support structure at a subscriber premises 18. High-frequency downstream signals 19 are supplied from a head end (not shown) of a cable network 20, such as a cable television (CATV) network, and the downstream signals 19 are delivered to the network interface device 10 at an input/output cable port 22 connected to the cable network 20.

Figure 2:
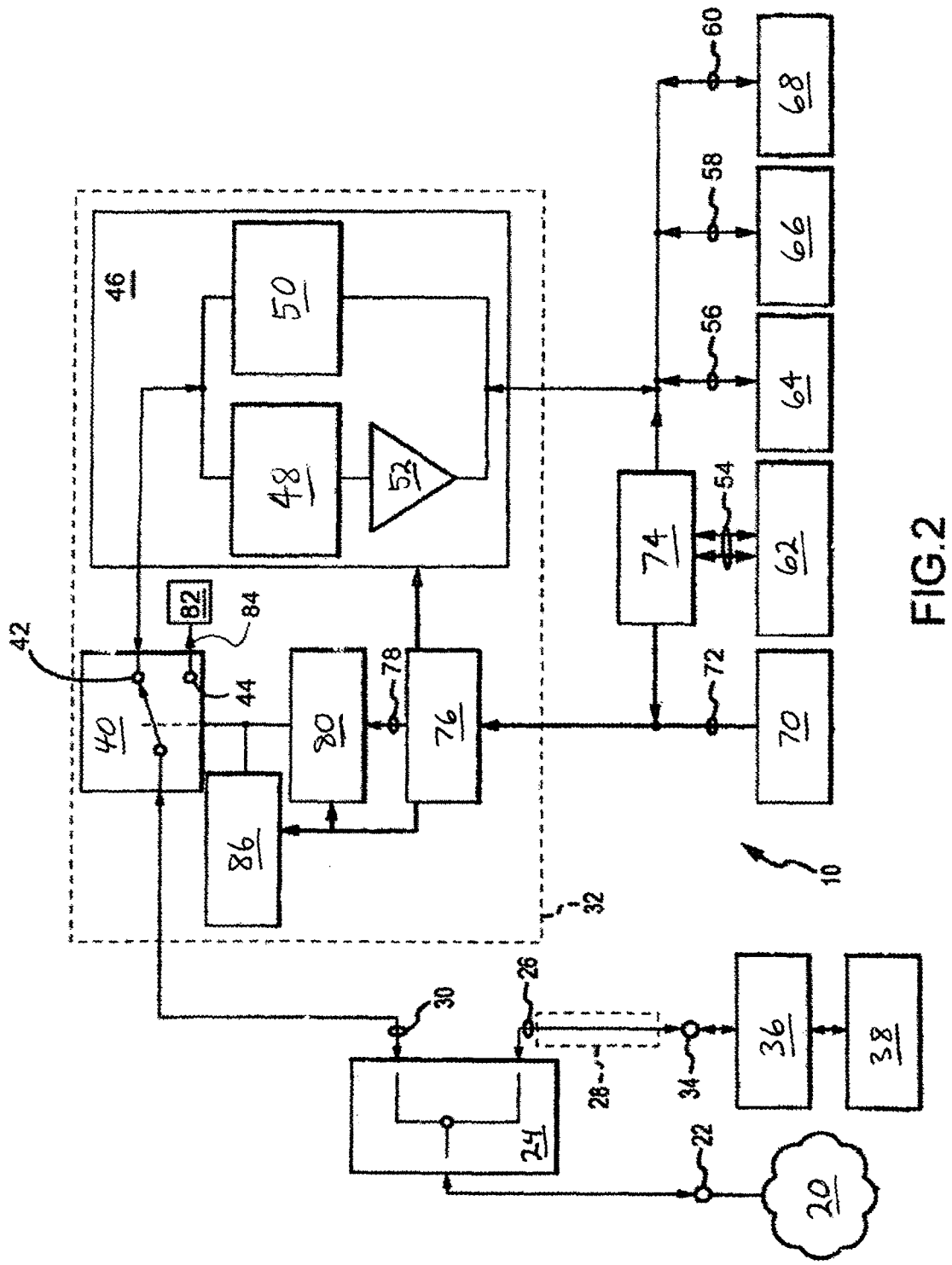
FIG. 2 depicts a block diagram of components within the network interface device shown in FIG. 1.

The passive and active internal electronic circuit components within the housing 12, shown in FIG. 2, include a conventional signal splitter, or directional coupler, 24 to communicate the CATV downstream signals 19 and upstream signals 25 with the CATV network 20. The signal splitter 24 separates the downstream signals 19 from the cable network 20 at the cable port 22 into passive branch signals 26, which are conducted through a passive branch circuit 28, and into active branch signals 30, which are conducted through an active branch circuit 32.

The passive branch signals 26 are delivered from a passive port 34 to those passive subscriber devices 36, 38 which respond to passive signals, such as a voice modem 36 connected to a telephone set 38, or an embedded multimedia network interface device (EMTA, not shown) which is located at the subscriber premises 18 (FIG. 1). The telephone set 38, the voice modem 36, and the EMTA, generate upstream signals 25 which are delivered to the passive port 34 and are conducted through the passive branch circuit 28 and the signal splitter 24 and are applied to the cable port 22 and conducted over the cable network 20 to the headend of the cable network.

Figure 3:
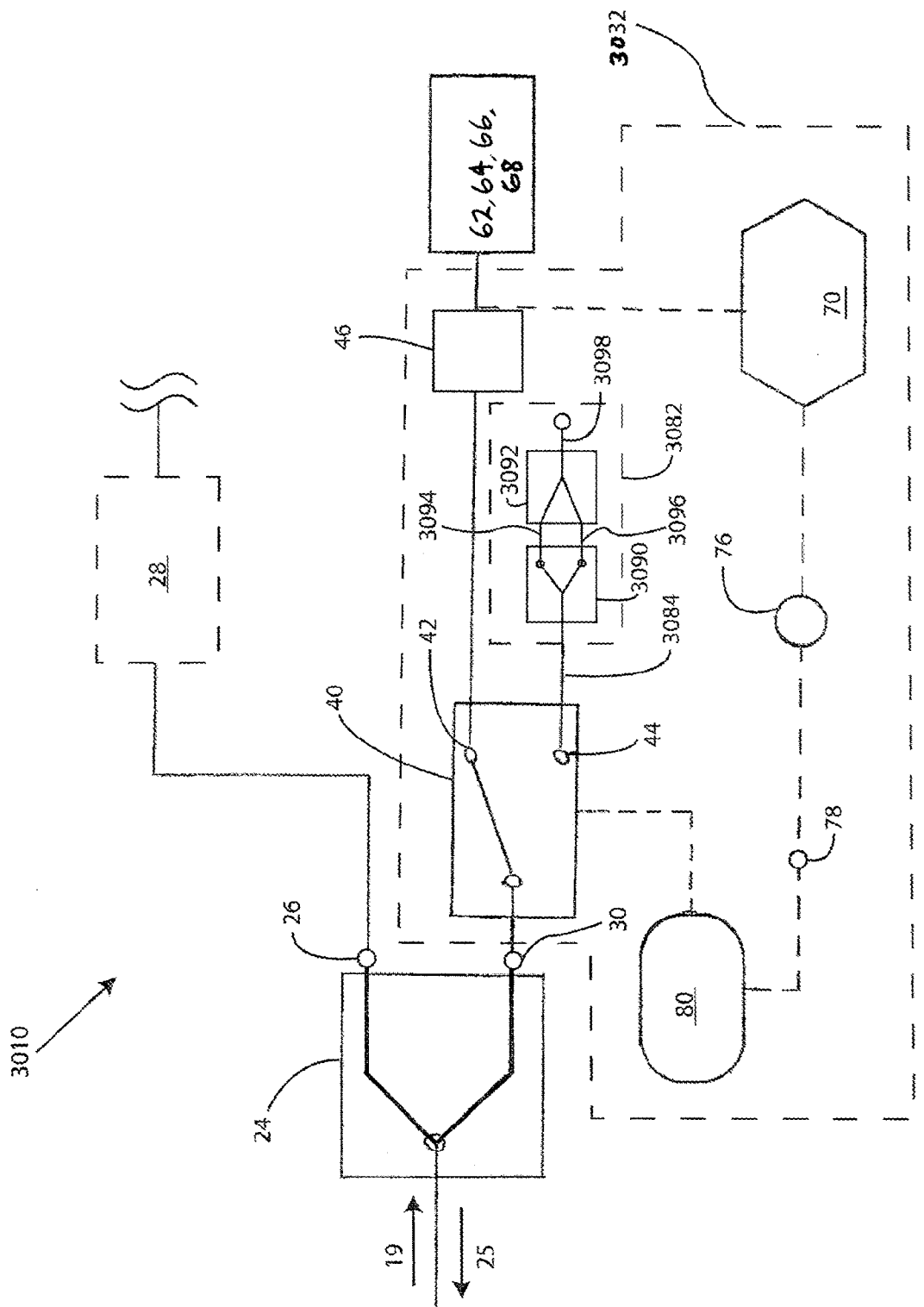
FIG. 3 depicts a block circuit diagram of the network interface device shown in FIG. 1, according to one embodiment of the present invention.

The active branch signals 30 may be supplied to a selectable switch 40 such as a relay switch that has an activated, or powered, position 42 and a deactivated, or unpowered, position 44. When in its activated position 42 as shown in FIGS. 2 and 3, the selectable switch 40 conducts the active branch signals 30 to active branch circuitry 46 of the network interface device 10. The active branch circuitry 46 may include an analog downstream filter 48, an analog upstream filter 50 and at least one active signal conditioner 52, such as a linear amplifier. The analog downstream filter 48 filters the active branch signals 30 and supplies the filtered active branch signals 30 to the amplifier 52. The amplifier 52 amplifies the active branch signals 30 and supplies the amplified active branch signals 30 to at least one, but preferably, a plurality of the active ports 54, 56, 58, 60. The active ports 54, 56, 58 60 deliver the amplified, or conditioned, active branch signals 30 to active subscriber devices 62, 64, 66, 68 located at the subscriber premises 18 (FIG. 1), such as television sets (TV) and/or data modems. Other data processing devices, such as computers, (not shown) are connected to the data modems.

The equipment at the subscriber's premises typically generates upstream signals 25 which are supplied to the network interface device 10 for subsequent delivery to the headend of the cable network 20. The upstream signals 25 may be generated by any of the subscriber devices 62, 64, 66, 68 connected to any of the active ports 54, 56, 58 60. For example, one or more of the TV sets may have conventional set top boxes (not shown) associated with them to allow the subscriber/viewer to make programming and viewing selections. Of course, any computers connected to the data modems typically communicate upstream signals 25.

The upstream signals 25 from the devices at the subscriber's premises 18 may be amplified by an active signal conditioner 52, such as a reverse amplifier or reverse signal conditioner, of the network interface device 10, before those amplified upstream signals 25 are delivered to the selectable switch 40, the signal splitter 24, the cable terminal 22 and the cable network 20. Amplifying the upstream signals 25 is optional, since the upstream signals 25 from subscriber devices 62, 64, 66, 68 are often passively transmitted without amplification through the active branch circuit 32 to the cable network 20. If a reverse amplifier or reverse signal conditioner is employed in a network interface device 10, such a device is connected in series with the analog upstream filter 50 to create an amplifying effect.

Electrical power for the active branch circuitry 46 and other components of the network interface device 10 is supplied from a conventional DC power supply 70 connected to a dedicated power input port 72. Alternatively, electrical power can be supplied through a conventional power inserter that is connected to the port 54. The power inserter allows relatively low voltage DC power to be conducted through the same port that also conducts the high-frequency signals, which in the situation shown in FIGS. 1 and 2, is the port 54. A power-signal divider 74 separates the high-frequency signals from the low voltage DC power and conducts the high-frequency signals to the active branch circuitry 46 and conducts the low voltage DC power to the same point that power is supplied from the dedicated port 72. Thus, regardless of whether electrical power is supplied through either one of the ports 54 or 72, the DC power operates the active components of the network interface device 10.

Use of a conventional power inserter connected to one of the ports, such as port 54, eliminates the need for a separate dedicated power supply port 72, or provides an alternative port through which electrical power can also be applied. The power supply 70 or the power supplied from the port 54 is typically derived from a conventional wall outlet (not shown) within the subscriber premises 18.

The ports 22, 34, 54, 56, 58 and 60 and 72 preferably comprise a conventional female coaxial cable connector (shown in FIG. 1) which is mechanically connected to the housing 12 (FIG. 1) and which is electrically connected to certain internal components (FIGS. 2 and 3) of the network interface device 10. Using a female coaxial cable connector for the ports 22, 34, 54, 56, 58 and 60 and 72 facilitates connecting coaxial cables (not shown) to the network interface device 10, by mechanically connecting the corresponding mating male coaxial cable connector (not shown) on the coaxial cable to the female coaxial cable connectors forming the ports 22, 34, 54, 56, 58 and 60 and 72.

The illustrated embodiment of the present invention automatically improves return loss by preventing excessive signal reflections which affect downstream signals 19 and upstream signals 25 passing through the passive branch circuit 28, in the event that the components of the network interface device 10, principally those of the active circuitry 46, become inoperative or abnormally operative. An inoperative or abnormally operative condition changes the impedance of the active circuitry 46, causing downstream signals 19 and upstream signals 25 to reflect back from the active circuitry 46 into the signal splitter 24, where those reflected signals interfere with and degrade the characteristics of the passive branch signals 26.

The proclivity for high-frequency signals to reflect is related to the impedance characteristics of the termination of the conductor which conducts those signals and to the frequency of those signals. For this reason, coaxial cables are typically terminated by connecting a terminating impedance between the signal-carrying center conductor and the surrounding reference plane shielding which has a terminating impedance value equal to a characteristic impedance between the signal-carrying conductor and the reference plane shielding. When the active circuitry 46 becomes inoperative or abnormally operative, the impedance of the active circuitry 46 enters an unintended and unanticipated state and causes significantly increased signal reflections, which leads to significantly degraded return loss. Return loss refers to the degradation of incident signals caused by reflected signals. An increase in the amount of the reflected signals increases the degradation of the incident signals, thereby causing a loss in the quality or fidelity of the incident signals. A degraded return loss equates to more downstream signal reflection. Improving the return loss maximizes the quality and fidelity of the downstream signals.

The active circuitry 46 enters an unanticipated impedance state, which alters the impedance of the active circuitry 46, if the network interface device 10 becomes inoperative as a result of losing its supply of applied electrical power or losing an adequate supply of applied electrical power. Under such circumstances the voltage from the power supply diminishes. A power loss of this nature may result from a failed power supply 70, or a disconnection or breakage in the conductor which supplies the electrical power from the power supply to one of the power input port 72 or 54.

The active circuitry also enters an unanticipated impedance state, which alters the impedance of the active circuitry 46, if a component of the network interface device 10 fails and causes it to consume an excessive amount of current, as would occur if a component failure caused a short circuit, or if a component of the network interface device 10 fails and causes it to consume a diminished amount of current, as would occur if a component failure caused an open circuit. The current drawn by the active circuitry 46 increases if the amplifier 52 enters a short-circuit condition, and the current drawn by the active circuitry 46 decreases if the amplifier 52 enters an open-circuit condition. Even if some other circuit component of the active circuit 46 becomes defective, that other circuit component has the potential of adversely affecting the amplifier 52, and may cause the amplifier 52 to consume more or less current than it would normally supply.

In one embodiment, a sensor 76, shown in FIG. 2, responds to changes in the voltage of the power supplied and/or to changes in the current consumed by the network interface device 10. Under inoperative or abnormally operative conditions, the sensor 76 sends a control signal 78 to a control circuit 80 such as a switch driver. The control circuit 80 responds to the control signal 78 by causing the selectable switch 40 to disconnect the active circuitry 46 from the active branch circuit 32 and conduct the active branch signals 30 to a phase cancellation circuit 82. In one embodiment, the selectable switch 40 assumes the activated position 42 in response to the assertion of the control signal 78 and communicates the active branch signals 30 between the CATV network 20 and the active subscriber devices 62, 64, 66, 68. The selectable switch 40 assumes the deactivated position 44 in response to the de-assertion of the control signal 78 and conducts the active branch signals 30 to a signal reduction path 84 to which the phase cancellation circuit 82 is connected.

The phase cancellation circuit 82 phase-shifts the active branch signals 30 out of phase and then reinserts them in-line to essentially cancel the potentially reflected signals. In one embodiment of the invention, the phase cancellation circuit 82 splits the active branch signals into a reference signal and a phase-delayed signal that is out of phase with respect to the reference signal. In one example, the phase-delayed signal is 180 degrees out of phase with respect to the reference signal. The phase cancellation circuit 82 then recombines the phase-delayed signal and the reference signal to a single, reduced active branch signal that minimizes the signal reflections into the signal splitter 24 and the cable network 20, thereby improving the return loss and preserving the characteristics of the passive branch signals 26 conducted in the passive branch 28.

By preserving the characteristic of the passive branch signals 26, the very important or essential passive subscriber devices 36, 38, such as a lifeline telephone set 38, will continue to operate without a substantial decrease in performance. Maintaining the telephone set 38 in a functional state is important in assuring the subscriber access to effective communication in emergency and urgent situations, as well as generally permitting high-fidelity voice communications under circumstances where an abnormally operative condition of the active circuitry 46 would prevent high-fidelity voice communications.

Of course when the active circuitry 46 is disconnected, active signals are not conducted to the active subscriber devices 62, 64, 66, and 68. High-quality signals would not be available to these active subscriber devices 62, 64, 66, 68 in any event because the inoperative or abnormally operative condition of the terminal adapter. The active subscriber devices 62, 64, 66, 68 connected to the active ports 54, 56, 58 and 60 are considered expendable in operation in order to preserve the more critical functionality of lifeline passive telephone communications through the telephone set 38.

Under normal operative conditions, the selectable switch 40 is held in its activated position shown in FIG. 2. Under inoperative or abnormally operative conditions, the control circuit 80 does not supply energy to hold the selectable switch 40 in the activated position shown in FIG. 2, but instead the selectable switch 40 naturally moves under the influence of its own internal mechanical bias to the alternative deactivated position (not shown) where the phase cancellation circuit 82 is connected in substitution for the active circuitry 46 in the active branch circuit 32.

When normal power delivery resumes and when power is normally supplied, the control circuit 80 will move the selectable switch 40 to the activated position shown in FIG. 2. However, it is unlikely that a component failure or degradation will be temporary, so it is unlikely that the network interface device 10 will resume normal operation after an excessive amount of current is consumed due to a failed or degraded component or after a minimal amount of current is consumed due to a failed or degraded component.

An indicator 86 may be attached to the control circuit 80. Whenever the control circuit 80 holds the selectable switch 40 in the activated position shown, the indicator 86 delivers an indication of normal functionality, such as a green light. Whenever the control circuit 80 allows the selectable switch 40 to connect the phase cancellation circuit 82 in substitution for the active circuitry 46, the indicator 86 delivers a different type of indication, such as a red light, which indicates an inoperative or abnormally operative condition. Of course, if there is a lack of power to the network interface device 10, the indicator 86 will not deliver any type of indication. The lack of any indication itself indicates a loss of power. The indicator 86 delivers the indication through a view window 88 in the housing 12 (FIG. 1).

Turning to FIG. 3, one embodiment of a network interface device 3010 including a signal splitter, or directional coupler, 24 to handle the CATV downstream signals 19 and upstream signals 25 is shown. The signal splitter 24 separates the downstream signals 19 into passive branch signals 26, which are conducted through a passive branch circuit 28, and into active branch signals 30, which are conducted through an active branch circuit 3032. The active branch signals 30 may be supplied to a selectable switch 40 such as a relay switch that has an activated, or powered, position 42 and a deactivated, or unpowered, position 44.

The network interface device 3010 includes a phase cancellation circuit 3082 realized as a first signal divider element 3090 in electrical series with a first signal coupling element 3092. The first signal divider element 3090 receives the active branch signals 30 and conducts them to the signal reduction path 3084 where the active branch signals 30 are divided into a reference signal 3094 and a phase-delayed signal 3096. In one example, a phase shift element (not shown) applies a 180-degree phase shift to the phase-delayed signal 3096. The reference signal 3094 and the 180-degree phase-delayed signal 3096 are then recombined at the first signal coupling element 3092, which in one example is a 0-degree combiner, resulting in a reduced active branch signal 3098 that is reduced in amplitude to a degree that will not cause detrimental reflections. The reduced active branch signal 3098 may be open, short or terminated.

Figure 4:
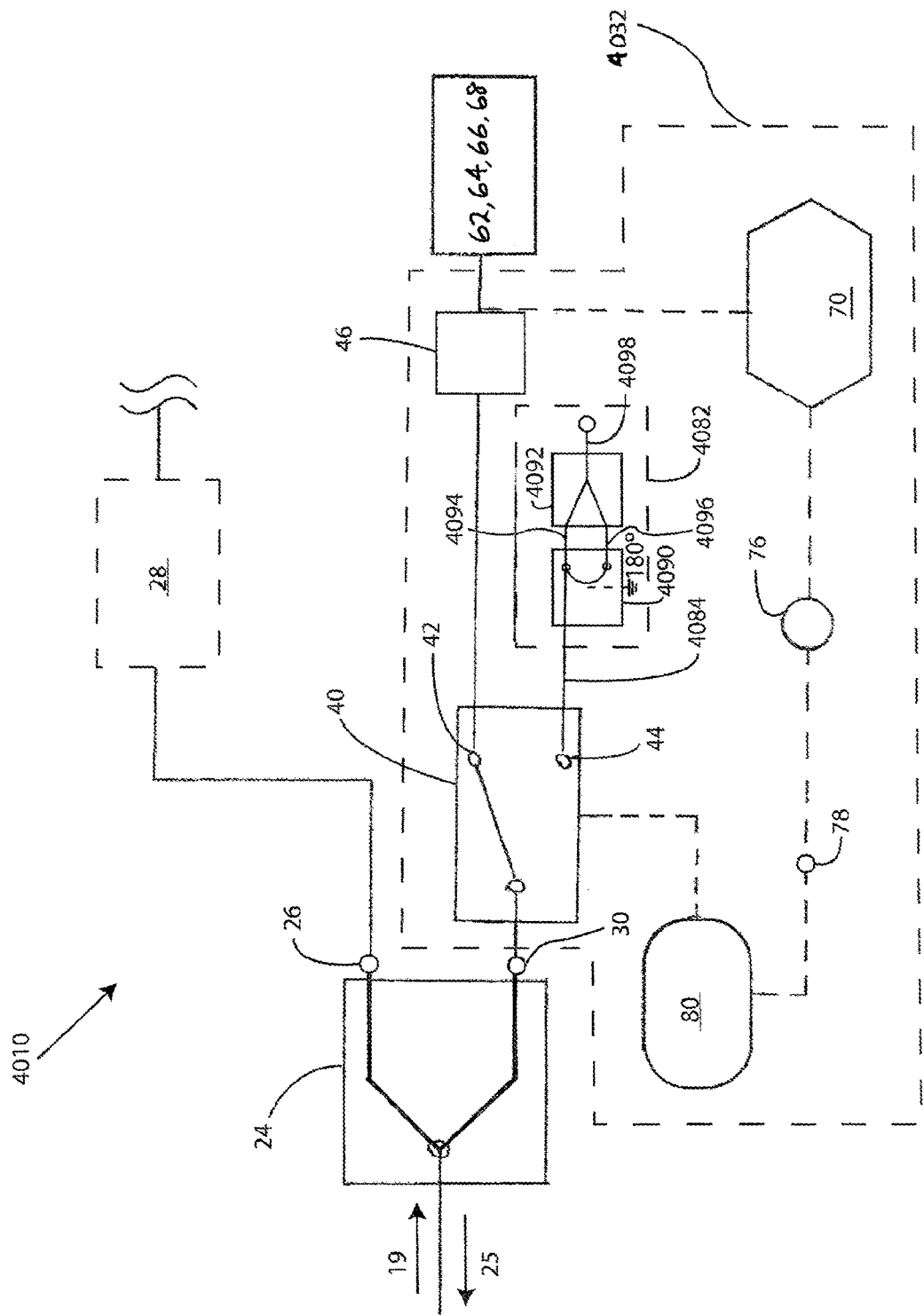
FIG. 4 depicts a block circuit diagram of the network interface device shown in FIG. 1, according to another embodiment of the present invention.

Turning now to FIG. 4, another embodiment of a network interface device 4010 including a signal splitter 24 to handle the CATV downstream signals 19 and upstream signals 25 is shown. The signal splitter 24 separates the downstream signals 19 into passive branch signals 26, which are conducted through a passive branch circuit 28, and into active branch signals 30, which are conducted through an active branch circuit 4032. The active branch signals 30 may be supplied to a selectable switch 40 such as a relay switch that has an activated, or powered, position 42 and a deactivated, or unpowered, position 44.

The network interface device 4010 includes a phase cancellation circuit 4082 realized as a balun transformer 4090 in series with a first signal coupling element 4092. The balun transformer 4090 joins an unbalanced line (e.g., one that has one conductor and a ground, such as a coaxial cable) to a balanced line (e.g., one that has two conductors with equal currents in opposite directions). In the disclosed embodiment, the balun transformer 4090 is a 1:1 transformer, having no impedance transformation, and converts the active branch signal 30 from the signal reduction path 4084 into a reference signal 4094 and a phase-delayed signal 4096 that is equal in magnitude and opposite in phase (e.g., 180 degrees) with respect to the reference signal 4094. The balanced output 4094, 4096 of the balun transformer 4090 is then recombined at a first signal coupling element 4092, which in the disclosed example is a 0-degree combiner, resulting in a reduced active branch signal 4098 that is reduced in amplitude to a degree that will not cause detrimental reflections. In one example, the phase cancellation circuit 4082 provides a return loss characteristic better than 20 dB.

Figure 5A:
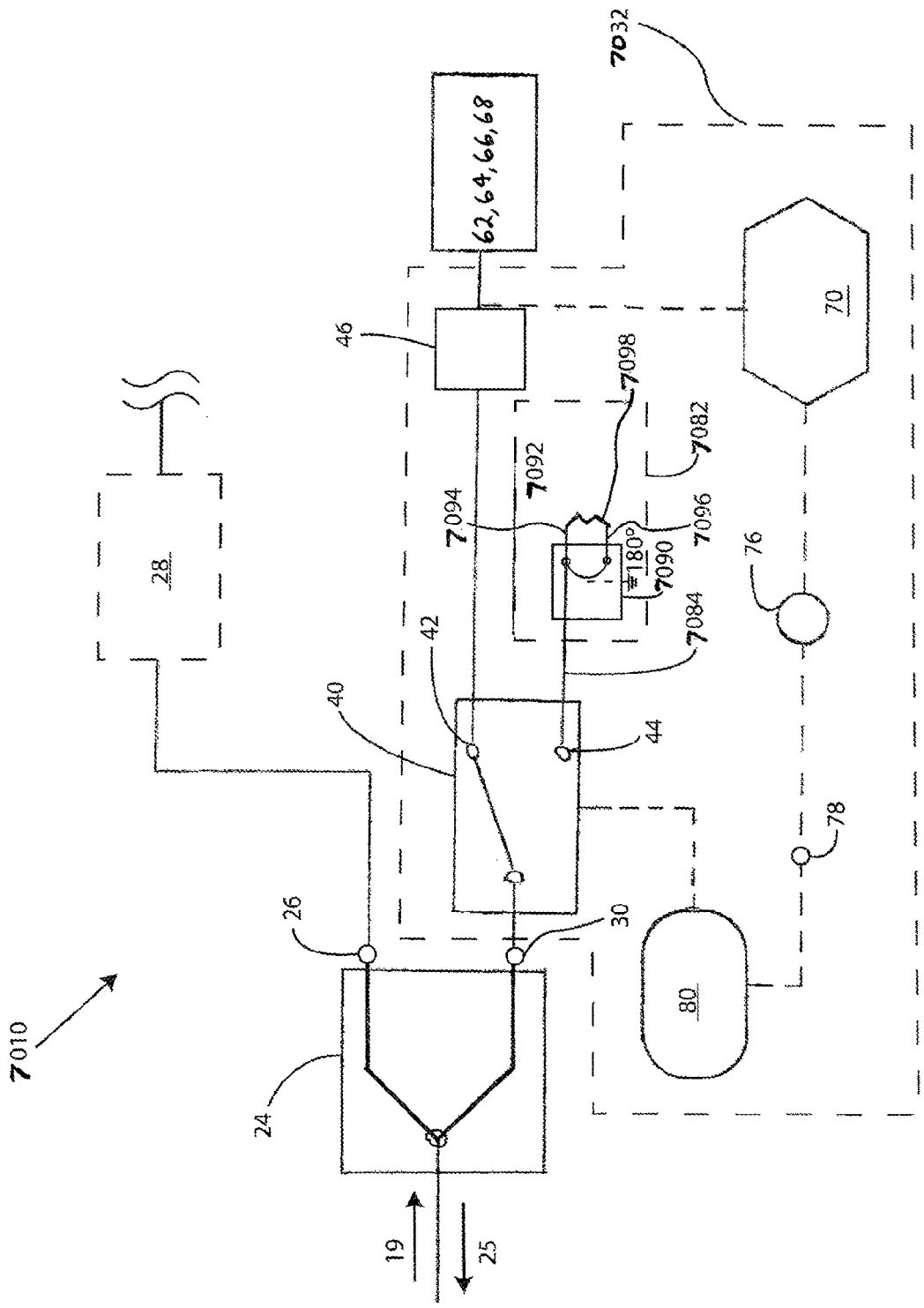
FIG. 5A depicts a block circuit diagram of the network interface device show in FIG. 1, according to yet another embodiment of the present invention.

Turning now to FIG. 5A, another embodiment of a network interface device 7010 including a signal splitter 24 to handle the CATV downstream signals 19 and upstream signals 25 is shown. The signal splitter 24 separates the downstream signals 19 into passive branch signals 26, which are conducted through a passive branch circuit 28, and into active branch signals 30, which are conducted through an active branch circuit 7032. The active branch signals 30 may be supplied to a selectable switch 40 such as a relay switch that has an activated, or powered, position 42 and a deactivated, or unpowered, position 44.

The network interface device 7010 includes a phase cancellation circuit 7082 realized as a balun transformer 7090 with a transform matched resistance across its outputs 7094, 7096. The balun transformer 7090 joins an unbalanced line (e.g., one that has one conductor and a ground, such as a coaxial cable) to a balanced line (e.g., one that has two conductors with equal currents in opposite directions). In the disclosed embodiment, the balun transformer 7090 may be one of a 1:1, 1:2, 1:3 . . . or 1:n transformer, having a respective impedance transformation, and converts the active branch signal 30 from the signal reduction path 7084 into a reference signal 7094 and a phase-delayed signal 7096 that is equal in magnitude and opposite in phase (e.g., 180 degrees) with respect to the reference signal 7094. The balanced output 7094, 7096 of the balun transformer 7090 is then recombined at the resistive element 7092, resulting in a reduced active branch signal 7098 that is reduced in amplitude to a degree that will not cause detrimental reflections. In one example, the phase cancellation circuit 7082 provides a return loss characteristic better than 20 dB.

Figure 5B:
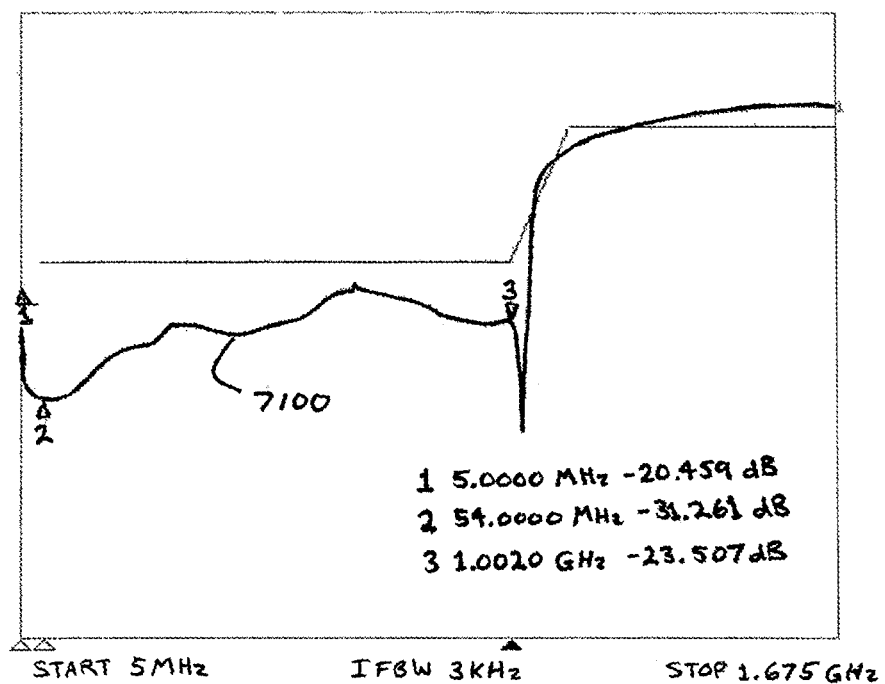
FIG. 5B depicts a graphical representation of the return loss characteristics of the circuit shown in FIG. 5A.

FIG. 5B depicts a graphical representation of the return loss characteristics of the circuit 32 shown in FIG. 5A when the selectable switch 40 is in its deactivated state 44. The return loss response 7100 is approximately 20 dB or better throughout the CATV range of frequencies (e.g., 5-1002 MHz).

Figure 6A:
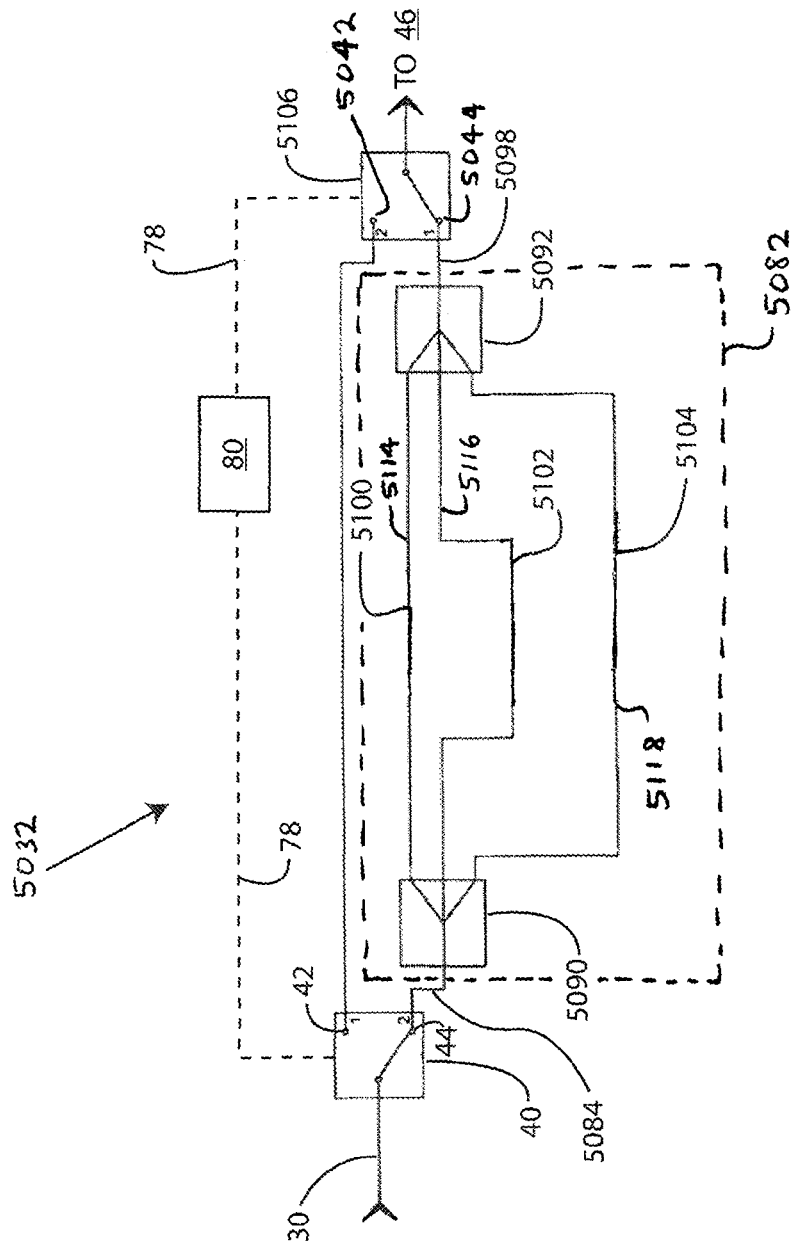
FIG. 6A depicts a block circuit diagram of the network interface device shown in FIG. 1, according to yet another embodiment of the present invention.

Turning now to FIG. 6A, one noted problem with phase cancellation circuitry is that the cancellation generally tends to work well in a fairly narrow band of frequencies. To overcome this deficiency and permit cancellation in the entire CATV spectrum, a phase cancellation circuit 5082 is provided in which electrical paths of differing electrical lengths are utilized to provide different phase delays. The phase cancellation circuit 5082 includes a first selectable switch 40 as described hereinabove. The first selectable switch 40 may be a relay switch that has an activated, or powered position, 42 and a deactivated, or unpowered, position 44. When the control circuit 80 de-asserts the control signal 78, the first selectable switch 40 assumes the deactivated position 44, thus passing active branch signal 30 to the signal reduction path 5084. The active branch signal 30 is received by a first signal divider element 5090, which in the illustrated embodiment is a 3-way signal splitter. The signal splitter 5090 divides the active branch signal 30 into three signal components on three electrical paths: a first signal component 5100 on an electrical path 5114 having a first, or reference, electrical length, a second signal component 5102 on an electrical path 5116 having a second electrical length, and a third signal component 5104 on an electrical path 5118 having a third electrical length. Each of the electrical lengths of the electrical paths 5114, 5116, 5118 differ, having the practical effect of phase-delaying each of the signal components 5100, 5102, 5104.

The phase-delayed signal components 5100, 5102, 5104 are recombined at a first signal coupler 5092 which, in one example, is a 0-degree coupler. The recombined active branch signal 5098 is reduced in amplitude to a degree that will not cause detrimental reflections. The electrical length refers to the distance over which a signal component 5100, 5102, 5104 travels the electrical path 5114, 5116, 5118 between the signal splitter 5090 and the first signal coupler 5092. The electrical length is, in one example, the length of the trace on the board that carries the signal components 5100, 5102, 5104.

In the depicted schematic diagram, the recombined active branch signal 5098 may be received at a second switch 5106. Similar to the first selectable switch 40, the second switch 5106 may be a relay switch that has an activated, or powered position, 5042 and a deactivated, or unpowered, position 5044. The second switch 5106 assumes the activated position 5042 in response to the assertion of the control signal 78 from the control circuit 80. When in its activated position 5042, the second switch 5106 conducts the active branch signal 30 to the active branch circuitry 46. In response to the de-assertion of the control signal 78, the second switch 5106 assumes the deactivated position 5044 as shown in FIG. 5A.

Figure 6B:
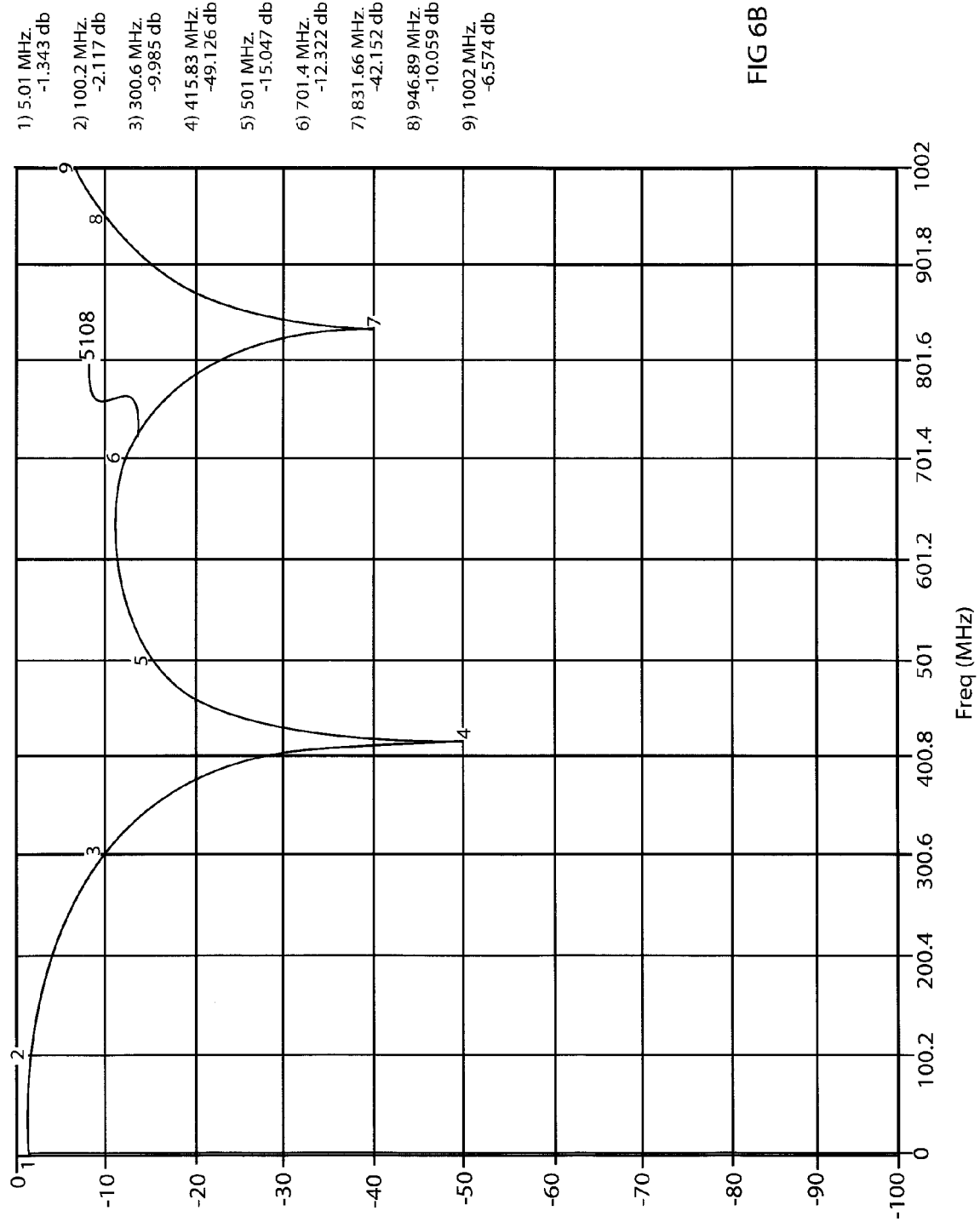
FIG. 6B depicts a graphical representation of the insertion loss characteristics of the circuit shown in FIG. 6A.

FIG. 6B depicts a graphical representation of the insertion loss characteristics of the active branch circuit 5032 shown in FIG. 6A when the first selectable switch 40 and the second selectable switch 5106 are in their respective deactivated states 44, 5044. The insertion loss response 5108 is approximately −10 dB or better throughout the CATV range of frequencies (e.g., 54-1002 MHz).

Figure 6C:
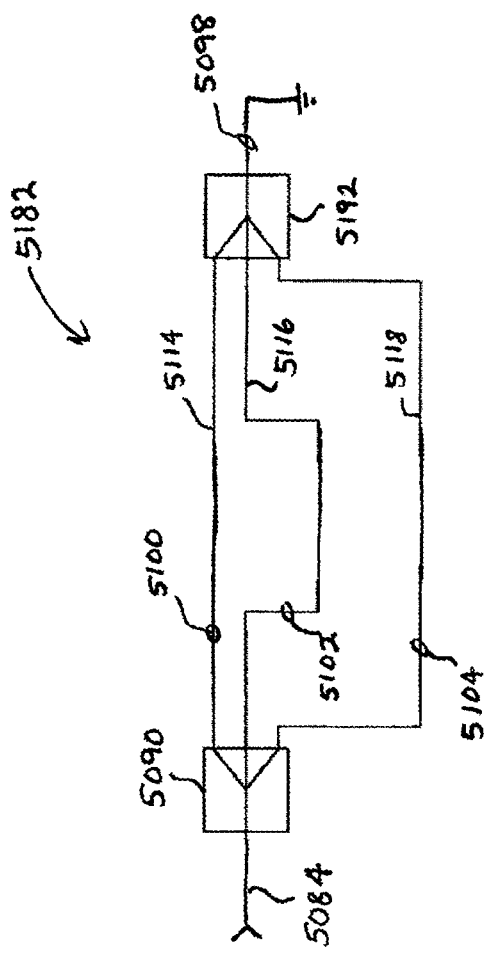
FIG. 6C depicts the block circuit diagram of the network interface device shown in FIG. 6A in a shorted state.
Figure 6D:
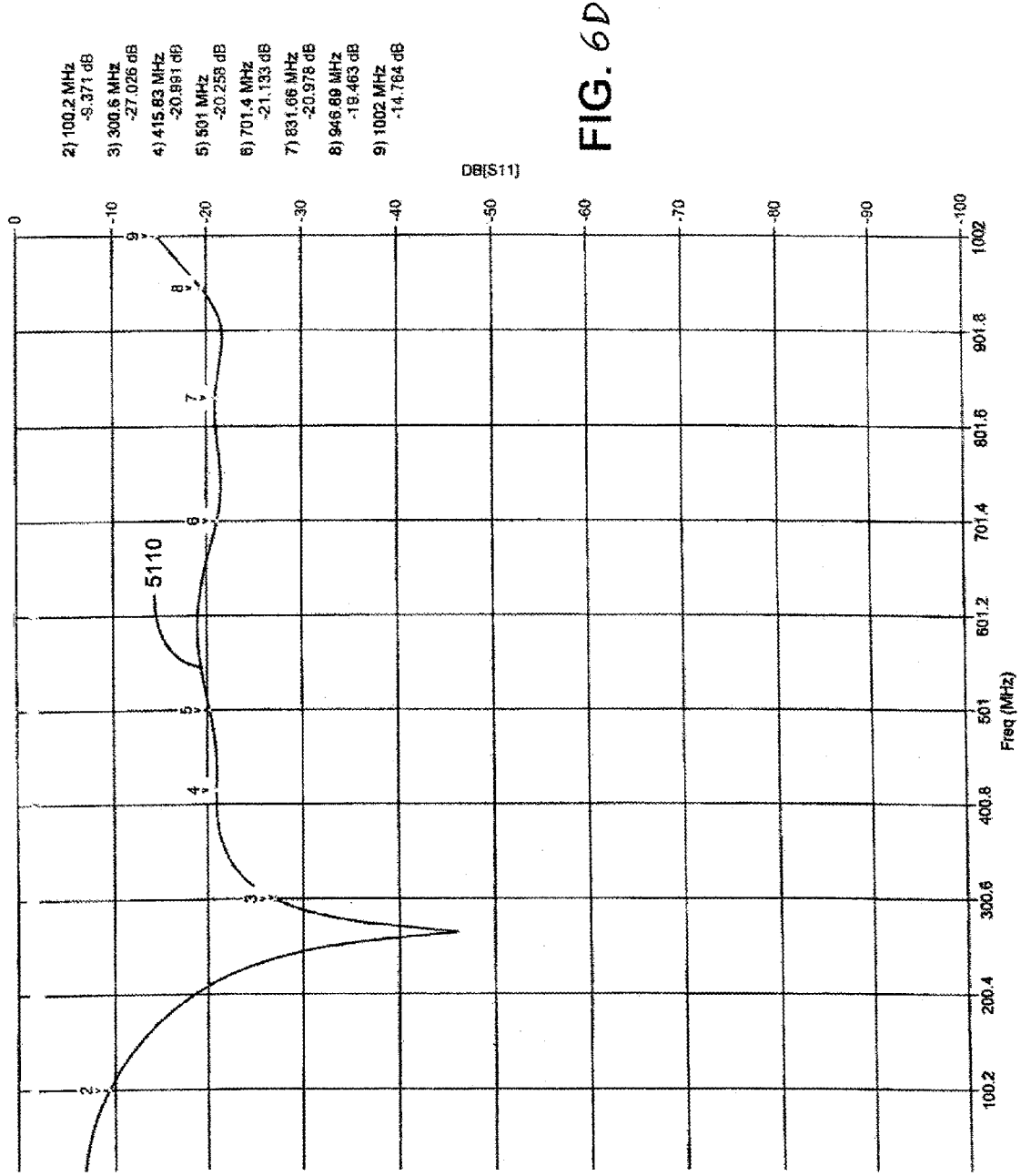
FIG. 6D depicts a graphical representation of the return loss characteristics of the circuit shown in FIG. 6C.

FIG. 6C depicts the block circuit diagram of a phase cancellation circuit 5182, which may be used in the active branch circuit 5032 of FIG. 6A, tied to ground for a shorted state. Stated another way, the reduced active branch signal 5098 is terminated to ground. FIG. 6D depicts a graphical representation of the return loss characteristics of the circuit shown in FIG. 6C. The return loss response 5110 is approximately −20 dB or better throughout the CATV range of frequencies, which is adequate to minimize the reflections into the passive subscriber devices 36, 38.

Figure 6E:
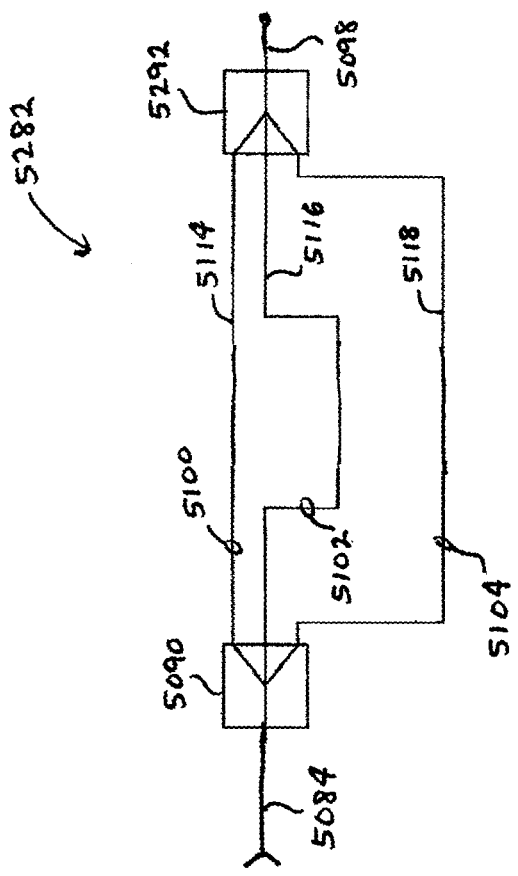
FIG. 6E depicts the block circuit diagram of the network interface device shown in FIG. 6A in an open state.
Figure 6F:
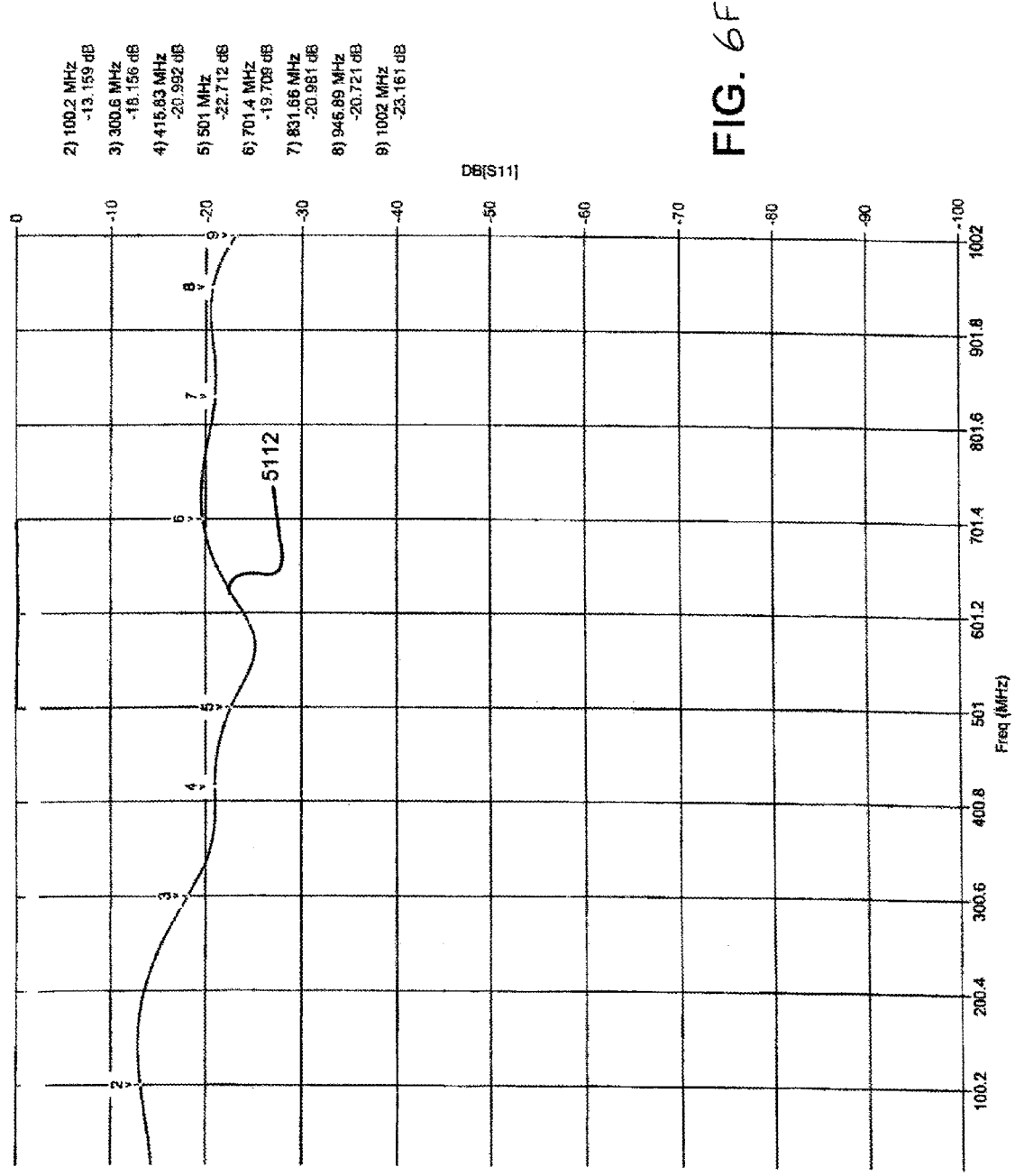
FIG. 6F depicts a graphical representation of the return loss characteristics of the circuit shown in FIG. 6E.

FIG. 6E depicts the block circuit diagram of the phase cancellation circuit 5282, which may be used in the active branch circuit 5032 of FIG. 5A, tied to an open state. Stated another way, the reduced active branch signal 5098 is open to ground. FIG. 6F depicts a graphical representation of the return loss characteristics of the circuit shown in FIG. 6E. The open return loss response 5112 is approximately −20 dB or better throughout the CATV range of frequencies, which is adequate to minimize the reflections into the passive subscriber devices 36, 38.

Figure 7:
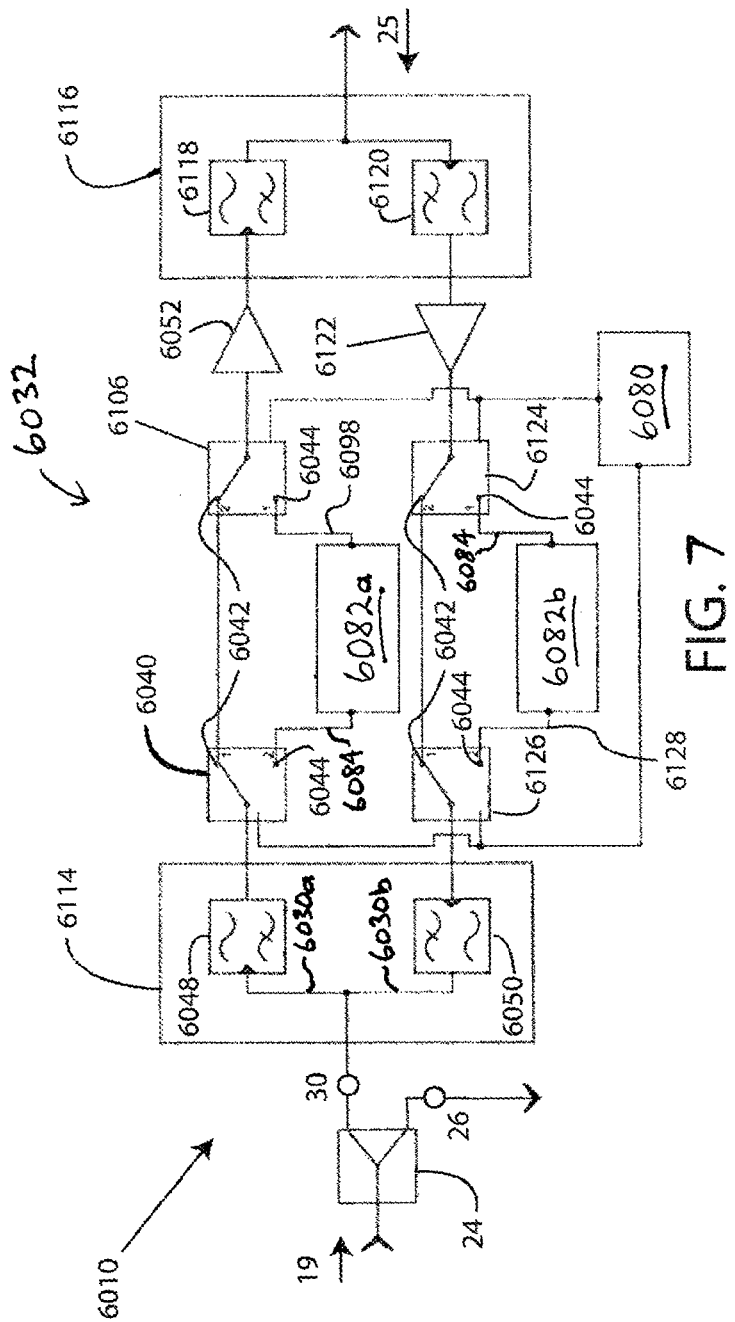
FIG. 7 depicts a block circuit diagram of the network interface device shown in FIG. 1, according to yet another embodiment of the present invention.

FIG. 7 depicts a block circuit diagram of a network interface device 6010 according to another embodiment of the present invention. The network interface device 6010 includes diplexer filters 6048, 6050, 6118, 6120 to isolate the active branch downstream signals 6030a and active branch upstream signals 6030b on the active branch circuit 6032, and provides a downstream phase cancellation circuit 6082a and an upstream phase cancellation circuit 6082b. The phase cancellation circuits 6082a, 6082b may be realized as any of the embodiments disclosed hereinabove and may each be configured differently in a given active branch circuit 6032. The network interface device 6010 includes a signal splitter 24 to communicate CATV downstream signals 19 and upstream signals 25 with the CATV network 20. The signal splitter 24 separates the downstream signals 19 into passive branch signals 26 and active branch signals 30. A first filter circuit 6114, which is realized as a diplexer circuit in the illustrated embodiment, includes a first high pass filter 6048 for passing the active branch downstream signals 6030a and a first low pass filter 6050 for passing the active branch upstream signals 6030b. In the disclosed embodiment, the high pass filter 6048 allows active branch downstream signals 6030a in the CATV band to pass, but attenuates active branch downstream signals 6030a in any other frequency. In one example, the high pass filter 6048 passes active branch downstream signals 6030a in the 54-1,002 MHz range. The first low pass filter 6050 allows active branch upstream signals 6030b in the CATV band to pass, but attenuates active branch upstream signals 6030b in any other frequency. In one example, the first low pass filter 6050 passes active branch upstream signals 6030b in the 5-42 MHz range.

The high pass filter 6048 connects to a first selectable switch 6040 such as a relay that is activated by control circuit 6080, as previously described. When the first selectable switch 6040 is in an activated position 6042, the filtered downstream signals 6030a pass to an activated position 6042 of a second selectable switch 6106, allowing the filtered downstream signals 6030a to pass to a downstream signal conditioner 6052, such as an amplifier.

When the first selectable switch 6040 is in a de-activated position 6044, the first selectable switch 6040 conducts the downstream signals 6030a to a signal reduction path 6084 to which the downstream phase cancellation circuit 6082a is connected. In one example, the reduced CATV downstream signal 6098 output from the downstream phase cancellation circuit 6082a connects to the deactivated position 6044 of the second selectable switch 6106. Alternatively, the reduced CATV downstream signal 6098 may be open, shorted, or terminated to ground (not shown).

The network interface device 6010 may further include a second filter circuit 6116 on the subscriber-side of the active branch circuit 6032, which is realized as a diplexer circuit in the illustrated embodiment. The second filter circuit 6116 includes a second high pass filter 6118 for passing the downstream signals 6030a and a second low pass filter 6120 for passing the upstream signals 6030b. In the disclosed embodiment, the second high pass filter 6118 passes downstream signals 6030a having the same frequency range as the high pass filter 6048, namely downstream signals 6030a in the 54-1,002 MHz range. The second high pass filter 6118 connects to the amplified downstream signal 6030a output of the active signal conditioner 6052.

The second low pass filter 6120 allows upstream signals 6030b in the CATV band to pass, but attenuates upstream signals 6030b in any other frequency. In one example, the first low pass filter 6050 passes upstream signals 6030b in the 5-42 MHz range. The second low pass filter 6120 may connect to an upstream signal conditioner 6122, such as an amplifier. The amplifier 6122 connects the amplified upstream signals 6030b to a first low pass switch 6124, such as a relay, that is also activated by the control circuit 6080. When the first low pass switch 6124 is in an activated position 6042, the filtered upstream signals 6030b pass to an activated position 6042 of a second low pass switch 6126, allowing the upstream signals 6030b to pass to the first low pass filter 6050.

When the first low pass switch 6124 is in a de-activated position 6044, the first low pass switch 6124 conducts the upstream signals 6030b to a signal reduction path 6084 to which the upstream phase cancellation circuit 6082b is connected. In one example, a reduced CATV upstream signal 6128 output from the upstream phase cancellation circuit 6082b connects to the deactivated position 6044 of the second low pass switch 6126. Alternatively, the reduced CATV upstream signal 6128 may be open or terminated to ground (not shown).

One advantage to the network interface device 6010 shown in FIG. 7 is that each phase cancellation circuit 6082a, 6082b may be designed to minimize reflections in a more narrow frequency range, thereby achieving better performance.

In the block diagrams depicted in FIGS. 6A, 6C, 6E, and 7, according to another embodiment of the present invention, the secondary switches 5042, 5206, 5306, 6106, 6124 may be omitted from the active branch circuit 5032, 6032. Instead, the traces between the activated position 5042, 6042 and the output of the secondary switches 5042, 5206, 5306, 6106, 6124 may be connected to provide the normal operational signal path through the active branch circuit 5032, 6032. In addition, when the selectable switches 40, 6044, and 6126 are in the deactivated position, the reduced CATV signals 6098, 6128 from the phase cancellation circuits 6082a, 6082b may be open, shorted, or terminated to ground (not shown).

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

We claim:

1. A network interface device operable to connect subscriber devices to a cable television (CATV) network over which (a) downstream signals are transmittable to the subscriber devices; and (b) upstream signals are transmittable from the subscriber devices, the subscriber devices including a passive subscriber device and an active subscriber device, the network interface device comprising:
    a first signal splitter configured to conduct CATV signals towards a passive branch circuit and an active branch circuit, the active branch circuit including an active signal conditioner configured to modify characteristics of active branch signals conducted through the active branch circuit;
    a sensor connected to the active branch circuit, the sensor configured to determine whether power consumption of the active branch circuit is indicative of one of: a normal condition, an inoperative condition and an abnormal condition of the network interface device, the sensor further configured to (a) supply a first control signal which is indicative of the normal condition in response to determining that the power consumption is indicative of the normal condition; and (b) remove the first control signal in response to determining that the power consumption is indicative of one of: the inoperative condition and the abnormal condition;
    a selectable switch connected to the active branch circuit, the selectable switch having an activated position and a deactivated position, the selectable switch configured to enable communication of the CATV signals between the CATV network and the active subscriber devices when in the activated position, and the selectable switch configured to enable communication of the CATV signals to a signal reduction path when in the deactivated position, the selectable switch configured to assume the activated position in response to the supplying of the first control signal and to assume the deactivated position in response to the removing of the first control signal; and
    a phase cancellation circuit connected to the signal reduction path, the phase cancellation circuit configured to split the CATV signals communicated to the signal reduction path into a first signal and a phase-delayed signal, the phase-delayed signal being substantially equal in magnitude and opposite in phase with respect to the first signal, the phase cancellation circuit further configured to recombine the first signal and the phase-delayed signal to a single, reduced CATV signal, where the reduced CATV signal cancels the first signal.

2. The network interface device of claim 1, wherein the phase cancellation circuit comprises a balun transformer in series with a 0-degree signal splitter.

3. The network interface device of claim 1, wherein the phase cancellation circuit comprises a first signal divider element and a first signal coupling element, the first signal divider element dividing the CATV signals into the first signal and the phase-delayed signal, the first signal coupling element combining the first signal and a phase-delayed signal.

4. The network interface device of claim 3, wherein the first signal divider element comprise a 180-degree signal splitter, and the first signal coupling element comprises a 0-degree combiner.

5. The network interface device of claim 1, wherein the first signal divider element comprises a 180-degree 1:4 balun transformer, and the first signal coupling element comprises a transform matched resistance.

6. The network interface device of claim 1, wherein the first control signal to assert the activated position of the switch has sufficient electrical power to operate the active branch circuit.

7. A network interface device operable to connect subscriber devices to a cable television (CATV) network over which (a) downstream signals are transmittable to the subscriber devices; and (b) upstream signals are transmittable from the subscriber devices, the subscriber devices including a passive subscriber device and an active subscriber device, the network interface device comprising:
    a first signal splitter configured to conduct CATV signals towards a passive branch circuit and an active branch circuit, the active branch circuit including an active signal conditioner configured to modify characteristics of active branch signals conducted through the active branch circuit;
    a sensor connected to the active branch circuit, the sensor configured to determine whether power consumption of the active branch circuit is indicative of one of: a normal condition, an inoperative condition and an abnormal condition of the network interface device, the sensor further configured to (a) supply a first control signal which is indicative of the normal condition; and (b) remove the first control signal in response to determining that the power consumption is indicative of one of: the inoperative condition and the abnormal condition;
    a selectable switch connected to the active branch circuit, the selectable switch having an activated position and a deactivated position, the selectable switch configured to enable communication of the CATV signals between the CATV network and the active subscriber devices when in the activated position, and the selectable switch configured to enable communication of the CATV signals to a signal reduction path when in the deactivated position, the selectable switch configured to assume the activated position in response to the supplying of the first control signal and to assume the deactivated position in response to the removing of the first control signal; and
    a phase cancellation circuit connected to the signal reduction path, the phase cancellation circuit configured to split the CATV signals communicated to the signal reduction path into a plurality of signal components and communicate the plurality of signal components to a corresponding plurality of electrical paths, each of the corresponding plurality of electrical paths having different electrical lengths.

8. The network interface device of claim 7, wherein the phase cancellation circuit further comprises a first signal divider element and a first signal coupling element, the first signal divider element dividing the CATV signals into the plurality of signal components, the first signal coupling element combining the plurality of signal components on the corresponding plurality of electrical paths.

9. The network interface device of claim 8, wherein, at the first signal coupling element, each of the plurality of signal components are phase shifted with respect to each other of the plurality of signal components, wherein a single reduced-strength CATV signal is output from the first signal coupling element, where the reduced-strength CATV signal cancels at least one of the plurality of signal components.

10. A network interface device operable to connect subscriber devices to a cable television (CATV) network over which (a) downstream signals are transmittable to the subscriber devices; and (a) valid upstream signals are transmittable from the subscriber devices, the subscriber devices including a passive subscriber device and an active subscriber device, the network interface device comprising:

a first signal splitter which configured to conduct upstream and downstream signals towards a passive branch circuit and an active branch circuit, the active branch circuit including an active signal conditioner configured to modify characteristics of active branch upstream and downstream signals conducted through the active branch circuit;

a sensor configured to determine whether power consumption of the active branch circuit is indicative of one of: a normal condition, an inoperative condition and an abnormal condition of the network interface device, the sensor further configured to (a) supply a first control signal which is indicative of the normal condition; and (b) remove the first control signal in response to determining that the power consumption is indicative of one of: the inoperative condition and the abnormal condition;

a first switch connected to the active branch circuit, the first switch having an activated position and a deactivated position, the first switch configured to enable communication of the upstream and downstream CATV signals between the CATV network and the subscriber devices when in the activated position, and the first switch configured to enable communication of the upstream and downstream signals to a signal reduction path when in the deactivated position, the selectable switch configured to assume the activated position in response to the supplying of the first control signal and to assume the deactivated position in response to the removing of the first control signal;

a phase cancellation circuit connected to the signal reduction path, the phase cancellation circuit configured to create a single, reduced CATV signal based on the downstream CATV signals communicated to the phase cancellation circuit, where the reduced CATV cancels at least part of the downstream CATV signals communicated to the phase cancellation circuit; and a second switch connected to the active branch circuit and the first control signal, the second switch having an activated position and a deactivated position, the second switch configured to enable communication of the upstream and downstream CATV signals between the CATV network and the active subscriber device when in the activated position, and the second switch configured to receive the reduced CATV upstream and downstream signal from the phase cancellation circuit when in the deactivated position, the second switch configured to assume the activated position in response to the supplying of the first control signal and to assume the deactivated position in response to the removing of the first control signal.

11. The network interface device of claim 10, the phase cancellation circuit configured to split the CATV upstream and downstream signals into a first signal and a phase-delayed signal, the phase-delayed signal being substantially equal in magnitude and opposite in phase with respect to the first signal, the phase cancellation circuit further configured to recombine the first signal and the phase-delayed signal to a single, reduced CATV upstream and downstream signal, where the reduced CATV signal cancels the first signal.

12. The network interface device of claim 10, the phase cancellation circuit connected to the signal reduction path, the phase cancellation circuit configured to split the CATV upstream and downstream signals into a plurality of signal component legs, each of the plurality of signal component legs being different electrical lengths.

13. The network interface device of claim 12, wherein the phase cancellation circuit further comprises a first signal divider element and a first signal coupling element, the first signal divider element dividing the CATV downstream signals into a plurality of signal component legs, the first signal coupling element combining the plurality of signal component legs.

14. The network interface device of claim 13, wherein at the first signal coupling element each of the plurality of signal component legs are phase shifted with respect to each other of the plurality of signal component legs, wherein a single reduced-strength CATV upstream and downstream signal is output from the first signal coupling element.

15. The network interface device of claim 10, further comprising a first filter circuit connected to the second switch, the first filter circuit comprising a first high pass filter configured to pass the downstream signals and a first low pass filter configured to pass the upstream signals.

16. The network interface device of claim 15, further comprising an active signal conditioner connected to at least one of the first high pass filter and the first low pass filter.

17. The network interface device of claim 16, further comprising a second high pass filter in communication with the first high pass filter and a second low pass filter in communication with the first low pass filter.

18. The network interface device of claim 1, where the first signal comprises downstream signals.

19. The network interface device of claim 1, where the selectable switch comprises a relay switch.

20. The network interface device of claim 1, where the phase cancellation circuit prevents signal reflections of the CATV signals communicated to the signal reduction path from interfering with the CATV signals conducted through the first signal splitter towards the passive branch circuit.

* * * * *